(12) United States Patent
Ogawa et al.

(10) Patent No.: US 11,603,461 B2
(45) Date of Patent: Mar. 14, 2023

(54) RESIN POWDER, RESIN POWDER FOR PRODUCING THREE-DIMENSIONAL OBJECT, AND THREE-DIMENSIONAL OBJECT PRODUCING METHOD

(71) Applicants: Satoshi Ogawa, Nara (JP); Tomoharu Miki, Kanagawa (JP)

(72) Inventors: Satoshi Ogawa, Nara (JP); Tomoharu Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 17/195,919

(22) Filed: Mar. 9, 2021

(65) Prior Publication Data
US 2021/0292540 A1    Sep. 23, 2021

(30) Foreign Application Priority Data
Mar. 23, 2020 (JP) ............................. JP2020-050889

(51) Int. Cl.
| | | |
|---|---|---|
| C08L 53/00 | (2006.01) | |
| B29C 64/153 | (2017.01) | |
| C08L 23/12 | (2006.01) | |
| B29K 23/00 | (2006.01) | |
| B29K 105/00 | (2006.01) | |

(52) U.S. Cl.
CPC ............ C08L 53/00 (2013.01); B29C 64/153 (2017.08); C08L 23/12 (2013.01); *B29K 2023/12* (2013.01); *B29K 2105/251* (2013.01)

(58) Field of Classification Search
CPC ....................................................... B33Y 70/00
See application file for complete search history.

(56) References Cited

U.S. PATENT DOCUMENTS

| | | |
|---|---|---|
| 2016/0009887 A1 | 1/2016 | Fukuzawa |
| 2016/0160021 A1 | 6/2016 | Kojima et al. |
| 2016/0177122 A1 | 6/2016 | Naruse et al. |
| 2016/0236412 A1 | 8/2016 | Kusahara et al. |
| 2016/0271877 A1 | 9/2016 | Suzuki et al. |
| 2016/0271879 A1 | 9/2016 | Yamashita et al. |
| 2017/0189960 A1 | 7/2017 | Ibe |
| 2017/0217087 A1 | 8/2017 | Tamoto et al. |
| 2017/0225404 A1 | 8/2017 | Naruse et al. |
| 2018/0023219 A1* | 1/2018 | Saito .................. D01F 6/06 427/532 |
| 2018/0215917 A1 | 8/2018 | Naruse |
| 2018/0273756 A1 | 9/2018 | Saito et al. |
| 2019/0134853 A1 | 5/2019 | Iwatsuki et al. |
| 2020/0016827 A1 | 1/2020 | Yamashita et al. |
| 2020/0070412 A1 | 3/2020 | Sun et al. |
| 2020/0070468 A1 | 3/2020 | Iida et al. |
| 2020/0079011 A1 | 3/2020 | Iwatsuki et al. |
| 2020/0332094 A1* | 10/2020 | Kumaraswamy ...... B33Y 80/00 |
| 2020/0362142 A1 | 11/2020 | Saito et al. |
| 2021/0023778 A1 | 1/2021 | Iida et al. |
| 2021/0292541 A1* | 9/2021 | Ogawa ................. B33Y 70/00 |

FOREIGN PATENT DOCUMENTS

| | | |
|---|---|---|
| CN | 110746693 | 2/2020 |
| EP | 3159141 | 4/2017 |
| JP | 2000-219766 | 8/2000 |
| JP | 3558503 | 5/2004 |
| JP | 2018-154116 | 10/2018 |
| JP | 2018-158571 | 10/2018 |
| JP | 6447494 | 12/2018 |
| JP | 2021-020371 | 2/2021 |

OTHER PUBLICATIONS

Extended European Search Report dated Aug. 19, 2021 in European Application No. 21161516.6, 26 pages.

* cited by examiner

*Primary Examiner* — Jeffrey C Mullis
(74) *Attorney, Agent, or Firm* — Grüneberg and Myers, PLLC

(57) ABSTRACT

Provided is a resin powder including a polyolefin-based resin, wherein a melting point of the resin powder is 150 degrees C. or higher, wherein a melt mass flow rate (MFR) of the resin powder measured according to JIS K 7210 is 0.35 (g/10 min) or greater but 8.50 (g/10 min) or less, and wherein a particle size distribution (volume average particle diameter Dv/number average particle diameter Dn) of the resin powder is 1.35 or less. In preferred embodiments, an average circularity of the resin powder is 0.975 or greater, and the polyolefin-based resin is a block copolymerized polypropylene resin.

7 Claims, 4 Drawing Sheets

Perimeter: C1
Particle projected area: S

Circle having area S
Perimeter: C2

RESIN POWDER, RESIN POWDER FOR PRODUCING THREE-DIMENSIONAL OBJECT, AND THREE-DIMENSIONAL OBJECT PRODUCING METHOD

CROSS-REFERENCE TO RELATED APPLICATIONS

The present application claims priority under 35 U.S.C. § 119 to Japanese Patent Application No. 2020-050889 filed Mar. 23, 2020. The contents of which are incorporated herein by reference in their entirety.

BACKGROUND OF THE INVENTION

Field of the Invention

The present disclosure relates to a resin powder, a resin powder for producing a three-dimensional object, and a three-dimensional object producing method.

Description of the Related Art

Hitherto, resin powders have been used in various fields. For example, it is known to use a resin powder as an object forming material for producing a three-dimensional object. For example, the resin powder described in Japanese Unexamined Patent Application Publication No. 2018-154116 has been known as a resin powder used for producing a three-dimensional object.

SUMMARY OF THE INVENTION

According to an aspect of the present disclosure, a resin powder contains a polyolefin-based resin. The melting point of the resin powder is 150 degrees C. or higher. The melt mass flow rate (MFR) of the resin powder measured according to JIS K 7210 is 0.35 (g/10 min) or greater but 8.50 (g/10 min) or less. The particle size distribution (volume average particle diameter Dv/number average particle diameter Dn) of the resin powder is 1.35 or less.

DESCRIPTION OF THE EMBODIMENTS (Resin Powder)

Figure 1A:
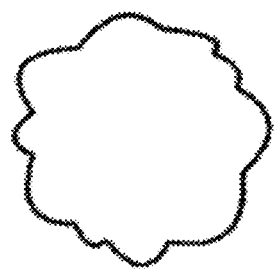
FIG. 1A is a schematic view illustrating a method for measuring a circularity of a particle.

A resin powder of the present disclosure contains a polyolefin-based resin. The melting point of the resin powder is 150 degrees C. or higher. The melt mass flow rate (MFR) of the resin powder measured according to JIS K 7210 is 0.35 (g/10 min) or greater but 8.50 (g/10 min) or less. The particle size distribution (volume average particle diameter Dv/number average particle diameter Dn) of the resin powder is 1.35 or less. The resin powder further contains an external additive and other materials as needed.

The present inventors have studied the following problems of existing techniques and obtained the following findings.

Existing resin powders have a high chargeability. Therefore, existing resin powders heavily attach to the members that handle the resin powders having contact with the resin powders. This makes it difficult to appropriately handle the resin powders when producing an object using the resin powders, and may consequently bring about a problem that a product produced with the resin powders cannot satisfy desired properties.

It has been found possible to make the resin powder of the present disclosure excellent in fluidity by providing the resin powder with a predetermined melting point, a predetermined MFR property, and a predetermined particle size distribution, even when the resin powder contains a polyolefin-based resin that is easily charged.

The present disclosure has an object to provide a resin powder excellent in fluidity.

The present disclosure can provide a resin powder excellent in fluidity.

The resin powder of the present disclosure can be used as materials and substitute materials for metals used in the fields of, for example, three-dimensional object production, electronic equipment, automobiles, prototypes and trial products for strength tests, surface modifiers, spacers, lubricants, paints, grindstones, additives, secondary battery separators, foods, cosmetics, garment, precision equipment, semiconductors, aerospace, and medical care. A resin powder for producing a three-dimensional object, used as a resin powder in production of a three-dimensional object, will be described in detail below.

<Polyolefin-Based Resin>

The polyolefin-based resin is a polymer obtained from polymerization of a monomer having a polyolefin skeleton. Polyolefin is a resin having a double bond of carbonized oxygen.

The polyolefin-based resin is used in a wide range of fields as a structural material because the polyolefin-based resin is inexpensive and has an excellent mechanical property. Therefore, studies into the polyolefin-based resin are actively conducted in a wide range of applications, particularly, an application to production of three-dimensional objects.

Examples of the polyolefin-based resin include polyethylene and polypropylene. One of these polyolefin-based resins may be used alone or two or more of these polyolefin-based resins may be used in combination. Among these polyolefin-based resins, polypropylene has good properties such as the highest heat resistance among commodity resins, a higher strength than other resins, an excellent chemical resistance, a low specific gravity with floatability on water, and non-hygroscopicity. Polypropylene can be produced industrially, and has a wide range of applications such as stationery, paper money, automobile parts, packaging materials, fiber products, plastic parts, various containers, and experimental tools.

Examples of the polypropylene resin include homopolypropylene, random copolymerized propylene, and block polypropylene.

Examples of the homopolypropylene include a propylene homopolymer.

Examples of the random copolymerized propylene include copolymers of ethylene and propylene.

Examples of the block polypropylene include a block copolymerized polypropylene obtained by polymerizing an ethylene-propylene-terpolymer (synthetic rubber) with homopolypropylene. One of these polypropylenes may be used alone or two or more of these polypropylenes may be used in combination.

Among these polypropylenes, the block copolymerized polypropylene resin that has a rubber elasticity and is used for exterior parts of automobiles is suitable for application to production of three-dimensional objects. For example, for use in production of three-dimensional objects, the block copolymerized polypropylene resin can produce three-dimensional objects excellent in heat resistance and strength.

Heat resistance of a three-dimensional object can be evaluated based on the deflection temperature under load.

The deflection temperature under load is one of testing methods for evaluating heat resistance of synthetic resins, and refers to a temperature at which the deflection level of a sample becomes constant when the temperature of the sample is raised in a state that a load, which is defined by the testing method standards, is applied to the sample. The testing method is stipulated by, for example, ASTM D648, and JIS 7191.

The strength of a three-dimensional object can be measured and evaluated according to a tensile test compliant with ISO 527.

—Melting Point—

The melting point of the resin powder is 150 degrees C. or higher, preferably 155 degrees C. or higher but 170 degrees C. or lower, and more preferably 160 degrees C. or higher but 168 degrees C. or lower. When the resin powder is used in production of a three-dimensional object, the resin powder that has a melting point of 150 degrees C. or higher can produce a three-dimensional object excellent in heat resistance.

The melting point can be measured by a method described below using a differential scanning calorimeter (DSC: TA-60S, available from Shimadzu Corporation).

Specifically, this method detects how a sample thermally behaves in accordance with temperature changes of the sample. Detailed conditions of the measuring method are compliant with JIS K-7121-1987 "Testing Methods for Transition Temperatures of Plastics).

Main thermal behaviors include exotherm, endotherm, and specific heat change. Exotherm or endotherm alone does not cause a baseline shift. In contrast, specific heat change causes a baseline shift.

As the conditions for measuring the melting point, a sample is weighed out in 5±0.5 mg in an aluminum pan, heated to 200 degrees C. at a heating rate of 10 degrees C./min in a nitrogen atmosphere, cooled to 0 degrees C., and then again heated to 200 degrees C. under the same conditions. An endothermic peak in this first measurement is employed as the melting point (Tm).

At the melting point, an endothermic peak is measured, and a baseline shift in the strict sense of the term does not occur.

—Melt Mass Flow Rate (MFR)—

The melt mass flow rate (MFR) means a value measured according to JIS K 7210. The melt mass flow rate (MFR) is a value indicating fluidity of a resin when melted. A lower melt mass flow rate means a lower fluidity. Specifically, for measuring the melt mass flow rate (MFR), a melt indexer G-02 (available from Toyo Seiki Co., Ltd.) is used, and the temperature in a cylinder (heat sleeve) is set with reference to the standard number corresponding to the material concerned and described in Table B.1 of an annex B to JIS K 7210. For example, for polypropylene (PP), the temperature is set to 230 degrees C. with reference to K 6921-1. The melt mass flow rate (MFR) is measured by extruding a melted sample from an orifice under a load of 5 kg and converting the amount of the sample discharged (between gauge lines) to the weight per ten minutes (unit: g/10 min).

The melt mass flow rate (MFR) of the resin powder is 0.35 (g/10 min) or greater but 8.50 (g/10 min) or less, preferably 0.50 (g/10 min) or greater but 7.00 (g/10 min) or less, more preferably 1.00 (g/10 min) or greater but 6.00 (g/10 min) or less, and yet more preferably 3.00 (g/10 min) or greater but 5.00 (g/10 min) or less. When the resin powder is used for production of a three-dimensional object, the resin powder that has a melt mass flow rate (MFR) of 0.35 (g/10 min) or greater but 8.50 (g/10 min) or less can be melted sufficiently and produce a three-dimensional object excellent in strength, surface property, and heat resistance.

When the melt mass flow rate (MFR) of the resin powder is 0.35 (g/10 min) or greater but 8.50 (g/10 min) or less, the resin powder has an excellent processing stability. When the viscosity of the resin powder is extremely low, when, for example, a melting kneading method is employed to produce the resin powder, a sufficient shear force cannot be applied to the resin powder having a low viscosity and an additive cannot be dispersed in the resin powder. When a grinding method is employed, because the resin powder having low viscosity is ground excessively and many minute particles occur, the resin powder has a poor fluidity. On the other hand, when the viscosity of the resin powder is excessively high, the resin powder cannot be kneaded by the melting kneading method, or cannot be ground by the grinding method, leading to a poor productivity.

—Particle Size Distribution (Volume Average Particle Diameter Dv/Number Average Particle Diameter Dn)—

The particle size distribution (volume average particle diameter Dv/number average particle diameter Dn) of the resin powder is an indicator of the distribution of particle sizes, and means a value measured by laser diffraction scattering method (Microtrac method, instrument name: MT3000II, available from MicrotracBel Corporation). MT3000II used for measuring the particle size distribution in the present disclosure needs to select a refractive index depending on the resin powder (sample) to be measured, as a setting for measurement. In the present disclosure, polyethylene is measured by a transparent mode at a refractive index of 1.53. Polypropylene is measured at a refractive index of 1.48, and a measured value obtained by a dry mode (solvent: air) is employed.

The particle size distribution of the resin powder is preferably 1.35 or less and more preferably 1.25 or less. When the particle size distribution of the resin powder is 1.35 or less, the resin powder can have an excellent fluidity. For example, when the resin powder is used for production of a three-dimensional object, layers can be densely filled with the resin powder when layers of the resin powder are additively manufactured, making it possible to improve the filling density during object production and improve the strength of a three-dimensional object to be produced. When the particle size distribution of the resin powder is 1.35 or less, fluidity of the resin powder can be improved and recoatability can be improved as a result.

——Volume Average Particle Diameter Dv——

The volume average particle diameter Dv of the resin powder is preferably 20 micrometers or greater but 100 micrometers or less and more preferably 30 micrometers or greater but 70 micrometers or less. When the volume average particle diameter Dv of the resin powder is 20 micrometers or greater but 100 micrometers or less, the resin powder can be suppressed from being aggregated due to charging, and can have an improved fluidity. When the resin powder is used in production of a three-dimensional object, the resin powder that has a volume average particle diameter Dv of 20 micrometers or greater but 100 micrometers or less is easily grounded smoothly in a powder bed additive manufacturing method because the resin powder has an excellent fluidity. When the resin powder has a volume average particle diameter Dv of 20 micrometers or greater but 100 micrometers or less, for example, layers can be densely filled with the resin powder when layers of the resin powder are additively manufactured, making it possible to improve the filling density during object production and improve the strength of a three-dimensional object to be produced.

The volume average particle diameter Dv can be measured according to the same method and using the same instrument as used for measuring the particle size distribution.

—Average Circularity—

As the average circularity, an arithmetic mean value of the circularity of the resin powder obtained by measurement can be used. A true circle has an average circularity of 1, and a more deformed circle has a lower average circularity value.

The average circularity of the resin powder is preferably 0.975 or greater and more preferably 0.980 or greater.

For example, when the resin powder is used in production of a three-dimensional object, layers can be densely filled with the resin powder that has an average circularity of 0.957 or greater when layers of the resin powder are additively manufactured, making it possible to improve the filling density during object production and improve the strength of a three-dimensional object to be produced.

As a method for easily obtaining the circularity, for example, the circularity can be quantified by measurement with a wet flow-type particle diameter/shape analyzer (instrument name: FPIA-3000, available from Sysmex Corporation).

The wet flow-type particle diameter/shape analyzer can capture, at a high speed, images of particles in a suspension flowing in a glass cell with a CCD, and analyze individual particle images real-time. Such a system for capturing images of particles and analyzing the images is effective for obtaining the average circularity of the present disclosure. The number of particles to be counted for measurement is not particularly limited, but is preferably 1,000 or greater and more preferably 3,000 or greater.

Figure 1B:
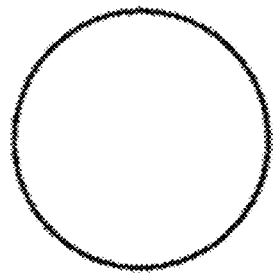
FIG. 1B is a schematic view illustrating a method for measuring a circularity of a particle.

Specifically, a surfactant, preferably alkylbenzene sulfonate (from 0.1 mL through 0.5 mL) is added as a dispersant to previously impurity solid-removed water (from 100 mL through 150 mL) in a container, and a measurement sample (about from 0.1 g through 0.5 g) is further added to the resultant. Subsequently, this measurement sample-dispersed suspension is subjected to dispersion treatment for about from one minute through three minutes using an ultrasonic disperser to prepare a dispersion liquid having a concentration of from 3,000 particles/microliter through 10,000 particles/microliter. The dispersion liquid is set in the wet flow-type particle diameter/shape analyzer, and the shape and distribution of the measurement sample are measured. Based on the measurement results, a value C2/C1 is calculated, where C1 is the perimeter of the projected shape of the measurement sample illustrated in FIG. 1A, and C2 is the perimeter of a true circle illustrated in FIG. 1B and having the same area as the projected area S of the projected shape of the measurement sample illustrated in FIG. 1A. An average of the value C2/C1 is used as the average circularity.

<External Additive>

The external additive is not particularly limited and may be appropriately selected depending on the intended purpose so long as fluidity at a high temperature (about 100 degrees C. or higher) can be secured. Examples of the external additive include resin minute particles and inorganic minute particles. When the resin powder has the external additive on the surface thereof, the resin powder has an improved fluidity, is suppressed from attaching to, for example, members that handle the resin powder, and has an improved handleability.

The minute particles refer to particles that have a number average particle diameter Dn of 0.001 micrometers or greater but 2.0 micrometers or less.

The number average particle diameter Dn of the external additive is preferably 0.1 micrometers or greater but 2.0 micrometers or less.

When the number average particle diameter Dn of the external additive is preferably 0.1 micrometers or greater but 2.0 micrometers or less, fluidity at a high temperature (about 100 degrees C. or higher) can be improved.

With the number average particle diameter Dn of the external additive described above, for example, when the resin powder is used for production of a three-dimensional object, layers can be densely filled with the resin powder when layers of the resin powder are additively manufactured, making it possible to improve the filling density during object production and improve the strength of a three-dimensional object to be produced.

With the number average particle diameter Dn of the external additive described above, for example, when the resin powder is used for production of a three-dimensional object, attachment of the resin powder to the members that handle the resin powder, such as a recoater, is reduced, and recoatability (handleability) can be improved.

Examples of the resin minute particles include acrylic resins, melamine resins, benzoguanamine resins, and copolymer resins containing these resins.

Examples of the inorganic minute particles include inorganic oxides such as silica, titania, alumina, and zinc oxide.

The external additive may serve as a lubricant or may serve as an aggregation preventing agent for preventing aggregation of particles.

Examples of the external additive that serves as a lubricant include surface treatments such as silicone oil treatment and HMDS treatment for reducing surface energy.

Examples of the external additive that serves as an aggregation preventing agent include resin particles having a large particle diameter.

The external additive to which surface treatment is appropriately applied may be used. Examples of the surface treatment include hydrophobizing treatment such as hexamethyl disilazane (HMDS) treatment, amine treatment, and fluorine treatment for charging.

The method for adding the external additive to the resin powder is not particularly limited and a known method may be employed. Examples of the method include a method of mixing the resin powder and the external additive using a mixer.

Examples of the mixer include a Henschel mixer.

The mixing conditions are not particularly limited and may be appropriately selected depending on the intended purpose. Examples of the mixing conditions include stirring and mixing at a stirring speed of 30 m/s for five minutes.

<Other Materials>

The other materials are not particularly limited and may be appropriately selected depending on the intended purpose. Examples of the other materials include an antistatic agent, a reinforcer, a flame retardant, a plasticizer, a stabilizer, an antioxidant, and a crystal nucleating agent. One of these materials may be used alone or two or more of these materials may be used in combination. These materials may be mixed with the polyolefin-based resin to be internally present in the resin powder, or may be attached on the surface of the resin powder.

The antistatic agent is not particularly limited and may be appropriately selected depending on the intended purpose. Examples of the antistatic agent include a water-insoluble antistatic agent.

Examples of the water-insoluble antistatic agent include a high-molecular-weight antistatic agent and a low-molecular-weight antistatic agent.

Examples of the high-molecular-weight antistatic agent include polyether-polyolefin block copolymers (block copolymers containing a polyether-based block and a polyolefin-based block) (ADEKA, AS-301E), polyolefin-polyethylene oxide block copolymers (product name: PELESTAT 303 available from Sanyo Chemical Industries, Ltd.), and polyether ester amides (product name: PELECTRON AS available from Sanyo Chemical Industries, Ltd.).

Examples of the low-molecular-weight antistatic agent include a boron-based complex (available from Japan Carlit Co., Ltd., LR-147), carbon black, carbon nanotube, and fullerenes.

Among these antistatic agents, polyolefin-polyethylene oxide block copolymer antistatic agents are preferable. A polyolefin-polyethylene oxide block copolymer antistatic agent is preferable because the antistatic agent mixes well with a polyolefin group, is easily dispersed in the particles of the resin powder, and a hydrophilic group has a charging property and is oriented outward.

These antistatic agents not only have a high resistance adjusting ability, but do not easily bleed out during processing and are not easily exposed to the surface of particles. Therefore, these antistatic agents have a characteristic of being uninfluential to fluidity due to the external environment at normal temperature or high temperatures.

The content of the antistatic agent is not particularly limited and may be appropriately selected depending on the intended purpose.

The reinforcer is added mainly for enhancing the strength, and is added as a filler or a packing material. Examples of the reinforcer include glass fillers, glass beads, carbon fiber, aluminum balls, and the reinforcers described in International Publication No. WO 2008/057844. One of these reinforcers may be used alone or two or more of these reinforcers may be used in combination. The reinforcer may be contained in the resin powder (particles). The resin powder of the present disclosure is preferably appropriately dry, or may be dried before use using a vacuum drier or with addition of silica gel.

<<Flame Retardant>>

Examples of the flame retardant include metal compounds and nitrogen compounds.

Examples of the metal compounds include antimony compounds and metal hydroxides.

Examples of the nitrogen compound include melamine cyanurate.

<<Plasticizer>>

Examples of the plasticizer include phthalic acid ester, adipic acid ester, and trimellitic acid ester.

<<Stabilizer>>

Examples of the stabilizer include phenol-based antioxidants, phosphite-based antioxidants, and phosphorus-based antioxidants.

<<Antioxidant>>

Examples of the antioxidant include hydrazide-based and amide-based antioxidants serving as metal deactivators, phenol-based (hindered phenol-based) and amine-based antioxidants serving as radical scavengers, phosphate-based and sulfur-phased antioxidants serving as peroxide decomposers, and triazine-based antioxidants serving as ultraviolet absorbents. One of these antioxidants may be used alone or two or more of these antioxidants may be used in combination. Particularly, combined use of radical scavengers and peroxide decomposers is known to be effective, and is particularly effective in the present disclosure.

The content of the antioxidant is preferably 0.05% by mass or greater but 5% by mass or less, more preferably 0.1% by mass or greater but 3% by mass or less, and particularly preferably 0.2% by mass or greater but 2% by mass or less relative to the total amount of the resin powder. When the content of the antioxidant is 0.05% by mass or greater but 5% by mass or less relative to the total amount of the resin powder, an effect of preventing thermal degradation of the resin powder is obtained, and the resin powder that has once been used for object production can be recycled when the resin powder is used for production of a three-dimensional object. An effect of preventing discoloration due to heat is also obtained.

<<Crystal Nucleating Agent>>

The crystal nucleating agent is not particularly limited and may be appropriately selected depending on the intended purpose.

(Method for Producing Resin Powder)

A method for producing a resin powder of the present disclosure is a method for producing the resin powder of the present disclosure, includes a step of using a melting kneading method, and further includes other steps as needed.

The materials used in the method for producing a resin powder of the present disclosure are the same as the materials of the resin powder of the present disclosure.

The steps of the melting kneading method will be described.

After the polyolefin-based resin and a water-soluble resin are mixed and kneaded using an extruder kneader, the resultant is rolled and cooled, and coarsely ground. The obtained coarsely ground product is washed with water to wash away only the water-soluble resin and extract the resin needed.

The water-soluble resin needs to have a viscosity of a certain level not only when dissolved in water but also when kneaded at a high temperature.

Examples of the water-soluble resin include resole-type phenol resins, methylolized urea (urea) resins, methylolized melamine resins, polyvinyl alcohols, polyethylene glycol, polyethylene oxides, polyacrylamides, and carboxymethyl cellulose (CMC).

Examples of the unit configured to mix the polyolefin-based resin and the water-soluble resin include a mixer. The mixer is not particularly limited and may be appropriately selected depending on the intended purpose so long as the mixer can mix the resins. Examples of the mixer that can perform stirring at a high speed include a Henschel mixer, a super mixer, and a mechanohybrid.

The extruder kneader is not particularly limited and may be appropriately selected depending on the intended purpose. Examples of the extruder kneader include a uniaxial kneader, a biaxial kneader, two rolls, and three rolls. In order to obtain a small particle diameter and a narrow distribution, there is a need for selecting a device that can perform high-speed dispersion.

Examples of the device that can perform high-speed dispersion include a KNEADEX kneader available from Nippon Coke & Engineering Co., Ltd.

For post treatment, the kneaded mixture is coarsely ground after rolled and cooled.

Examples of the rolling cooling device include a drum cooler available from Nippon Coke & Engineering Co., Ltd.

The coarse grinder is not particularly limited and may be appropriately selected depending on the intended purpose so long as the obtained kneaded product can be coarsely ground to chips having a size of about 2 mm. Examples of the coarse grinder include RHOTOPLEX, a hammer mill, a feather mill, and a cutter mill.

Next, the obtained coarsely ground products are washed with water.

Subsequently, the water-soluble resin and the polyolefin-based resin powder are subjected to solid-liquid separation by filtration. The sample on the filter paper is collected and dried on a fluid bed for 48 hours. In this way, the resin powder can be obtained.

The method for producing a resin powder of the present disclosure can produce particles having an average circularity of 0.975 or greater, and can produce a resin powder having a narrow particle size distribution (a particle size distribution of 1.35 or less) through a smaller number of steps.

(Resin Powder for Producing Three-Dimensional Object)

A resin powder for producing a three-dimensional object of the present disclosure contains a polyolefin-based resin. The melting point of the resin powder for producing a three-dimensional object is 150 degrees C. or higher. The melt mass flow rate (MFR) of the resin powder for producing a three-dimensional object measured according to JIS K 7210 is 0.35 (g/10 min) or greater but 8.50 (g/10 min) or less. The particle size distribution (volume average particle diameter Dv/number average particle diameter Dn) of the resin powder for producing a three-dimensional object is 1.35 or less. The resin powder for producing a three-dimensional object further contains an external additive and other components as needed.

The resin powder for producing a three-dimensional object of the present disclosure is the same as the resin powder of the present disclosure.

The resin powder for producing a three-dimensional object of the present disclosure can be used in SLS method and SMS method, and has properties that appropriately balance parameters such as particle size, particle size distribution, heat transfer property, melt viscosity, bulk density, fluidity, melting temperature, and recrystallization temperature.

The resin powder for producing a three-dimensional object of the present disclosure is effective for production of a three-dimensional object using a laser sintering method by a PBF method such as a selective laser sintering (SLS) method or a selective mask sintering (SMS) method.

Using the resin powder for producing a three-dimensional object of the present disclosure, it is possible to obtain a three-dimensional object excellent in fluidity and handleability (recoatability), having a high dimensional accuracy and a high strength, and excellent in surface property (orange peel property).

(Method for Producing Resin Powder for Producing Three-Dimensional Object)

A method for producing a resin powder for producing a three-dimensional object is the same as the method for producing a resin powder of the present disclosure.

(Three-Dimensional Object Producing Method and Three-Dimensional Object Producing Apparatus)

A three-dimensional object producing method of the present disclosure repeats a layer forming step of forming a layer containing the resin powder for producing a three-dimensional object of the present disclosure and a powder bonding step of mutually bonding the particles of the resin powder for producing a three-dimensional object in a selected region of the layer formed, and further includes other steps as needed.

A three-dimensional object producing apparatus of the present disclosure includes a layer forming unit configured to form a layer containing the resin powder for producing a three-dimensional object of the present disclosure, and a powder bonding unit configured to mutually bond the particles of the resin powder for producing a three-dimensional object in a selected region of the layer formed, and further includes other units as needed.

As the resin powder for producing a three-dimensional object, the resin powder of the present disclosure may also be used.

The resin powder for producing a three-dimensional object can be used in and is effective for all kinds of three-dimensional object producing apparatuses of a powder bed additive manufacturing type. Three-dimensional object producing apparatuses of a powder bed additive manufacturing type are varied in the unit configured to, after a layer of a powder is formed, mutually bond the particles of the resin powder for producing a three-dimensional object in a selected region of the layer of the powder, and examples of the unit generally include an electromagnetic irradiating unit represented by SLS method and SMS method, and a liquid discharging unit represented by binder jet method. The resin powder for producing a three-dimensional object of the present disclosure can be applied to any of these methods, and is effective for all three-dimensional object producing apparatuses that include a unit configured to additively manufacture layers of a powder.

"Bonding" means maintaining a state of one substance contacting another substance at the interface between the substances.

The powder bonding unit is not particularly limited and may be appropriately selected depending on the intended purpose. Examples of the powder bonding unit include a unit configured to emit electromagnetic waves.

Examples of the electromagnetic irradiation source used for electromagnetic irradiation in a three-dimensional object producing apparatus of SLS type and SMS type employing electromagnetic irradiation include lasers configured to emit ultraviolet rays, visible light rays, and infrared rays, microwaves, discharge, electron beams, radiation heaters, LED lamps, and combinations thereof.

When employing electromagnetic irradiation as a method for selectively bonding particles of the resin powder for producing a three-dimensional object, it is optional to promote efficient absorption of electromagnetic waves or inhibit absorption of electromagnetic waves. For example, an absorbent or an inhibitor may be added in the resin powder for producing a three-dimensional object.

A three-dimensional object formed by laser sintering of the resin powder for producing a three-dimensional object is smooth and has a surface having a sufficient resolution that is lower than or equal to the minimum orange peel.

The orange peel generally refers to surface defects present in the surface of a three-dimensional object formed by laser sintering by PBF, such as an inappropriate coarse surface, voids, or distortion.

For example, the voids not only spoil the appearance, but also may significantly affect the mechanical strength.

It is preferable that a three-dimensional object formed by laser sintering of the resin powder for producing a three-dimensional object not exhibit inappropriate process properties such as warpage, distortion, and fuming due to phase change that occurs during cooling performed from the middle of sintering until after sintering.

Using the resin powder for producing a three-dimensional object of the present disclosure, it is possible to obtain a three-dimensional object having a high dimensional stability and a high strength and excellent in surface property (orange peel property).

The resin powder for producing a three-dimensional object of the present disclosure further has an excellent recyclability, and it is possible to suppress degradation of dimensional accuracy and strength of a three-dimensional object even if excessive powder is used repeatedly to form the three-dimensional object.

Recycled powder used in the present disclosure can form a 150 mm-long multipurpose dog bone-like test specimen that is compliant with International Organization for Standardization (ISO) 3167 Type 1A and that will not exhibit strength degradation even when the recycled powder has been tested according to a recycling testing method described below at least once, more preferably five times, yet more preferably seven times, and particularly preferably at least ten times in a PBF type producing apparatus (available from Ricoh Company, Ltd., AM S5500P).

Figure 2:
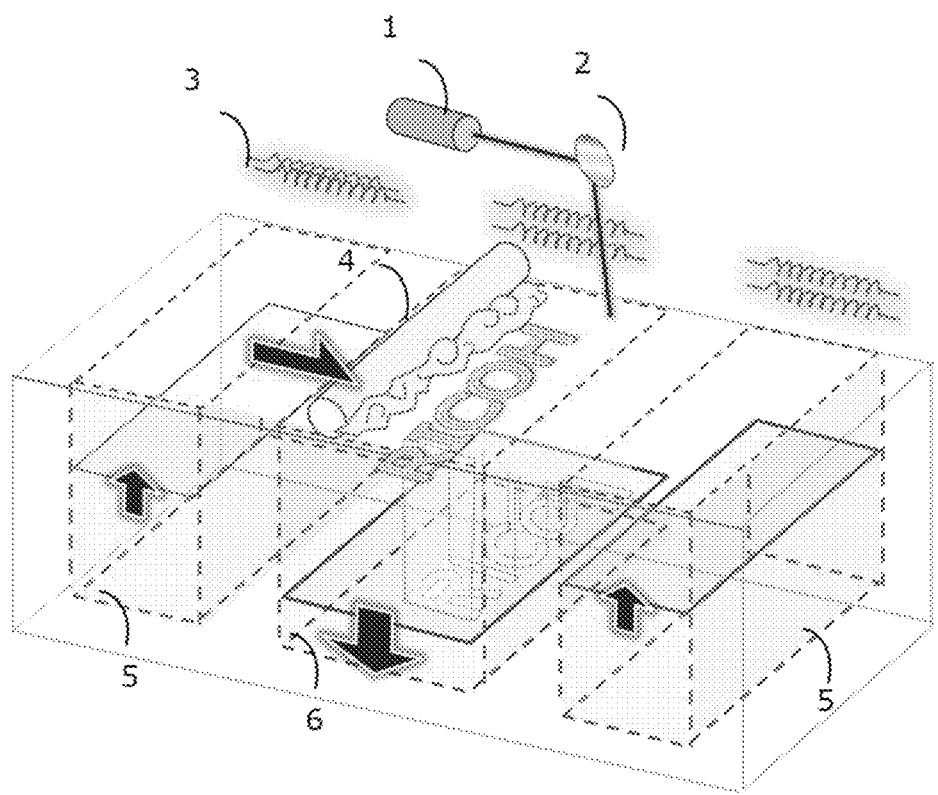
FIG. 2 is a schematic view illustrating an example of a three-dimensional object producing apparatus used in a three-dimensional object producing method of the present disclosure.

Next, an example of the three-dimensional object producing apparatus will be described with reference to FIG. 2. FIG. 2 is a schematic view illustrating an example of the three-dimensional object producing apparatus. As illustrated in FIG. 2, a powder is stored in a powder supplying tank 5, and a roller 4 supplies the powder to a laser scanning space 6 in accordance with the amount of powder to be used. It is preferable that the supplying tank 5 be temperature-adjusted by a heater 3. Via a reflection mirror 2, the laser scanning space 6 is irradiated with a laser output by an electromagnetic irradiation source 1. A three-dimensional object can be obtained through sintering of the powder by the heat of the laser.

The temperature of the supplying tank 5 is preferably lower than the melting point of the powder by 10 degrees C. or more.

The parts bed temperature in the laser scanning space is preferably a temperature lower than the melting point of the powder by 5 degrees C. or more.

The laser output power is not particularly limited, may be appropriately selected depending on the intended purpose, and is preferably 10 watts or higher but 150 watts or lower.

In another embodiment, a three-dimensional object of the present disclosure can be produced using a selective mask sintering (SMS) technique. For example, the SMS process described in, for example, U.S. Pat. No. 6,531,086 can be suitably employed.

In the SMS process, a shielding mask is used to selectively shield infrared radiation and selectively irradiate a part of a powder layer with infrared rays. When employing the SMS process in order to produce a three-dimensional object using the resin powder for producing a three-dimensional object of the present disclosure, it is possible and effective to add a material that enhances the infrared absorbing property of the resin powder for producing a three-dimensional object in the resin powder for producing a three-dimensional object. For example, the resin powder for producing a three-dimensional object may contain one or more kinds selected from heat absorbents and dark materials (e.g., carbon fiber, carbon black, carbon nanotube, or carbon fiber, and cellulose nanofiber).

In yet another embodiment, a three-dimensional object can be produced using the resin powder for producing a three-dimensional object of the present disclosure and a three-dimensional object producing apparatus of the binder jet type described above. This method repeats a layer forming step of forming a layer formed of the resin powder for producing a three-dimensional object of the present disclosure, and a powder bonding step of discharging a liquid to a selected region of the layer formed and drying the liquid to mutually bond particles of the resin powder for producing a three-dimensional object, and further includes other steps as needed.

The three-dimensional object producing apparatus of the present disclosure includes a layer forming unit configured to form a layer formed of the resin powder for producing a three-dimensional object of the present disclosure, and a unit configured to discharge a liquid to a selected region of the layer formed, and further includes other units as needed. It is preferable that the unit configured to discharge a liquid employ an inkjet method in terms of dimensional accuracy of a three-dimensional object to be obtained and object production speed.

FIG. 3 illustrates an example of a schematic view of a binder jet process. The three-dimensional object producing apparatus illustrated in FIG. 3 includes a power storing tank 11 for forming and a powder storing tank 12 for supplying. These powder storing tanks include stages 13 movable in the vertical direction respectively. The resin powder for producing a three-dimensional object of the present disclosure is placed over the stages 13, to form a layer formed of the resin powder for producing a three-dimensional object. Above the powder storing tank 11 for forming, the three-dimensional object producing apparatus includes a three-dimensional object producing liquid material supplying unit 15 configured to discharge a liquid material 16 for producing a three-dimensional object to the resin powder for producing a three-dimensional object in the powder storing tank 11. The three-dimensional object producing apparatus also includes a layer forming unit 14 (hereinafter may also be referred to as leveling mechanism or recoater) that can supply the resin powder for producing a three-dimensional object from the powder storing tank 12 for supplying to the powder storing tank 11 for forming while leveling the surface of (a layer) of the resin powder for producing a three-dimensional object in the powder storing tank 11 for forming.

Figure 3A:
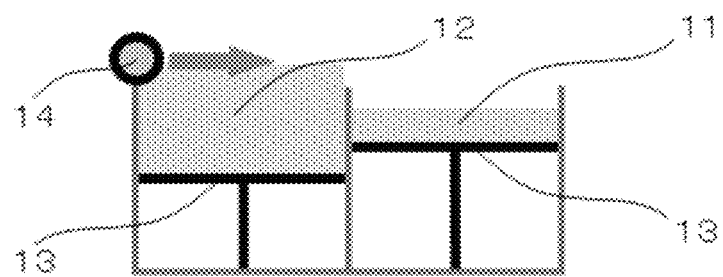
FIG. 3A is a schematic view illustrating an example of a step of forming a powder layer having a smooth surface.
Figure 3B:
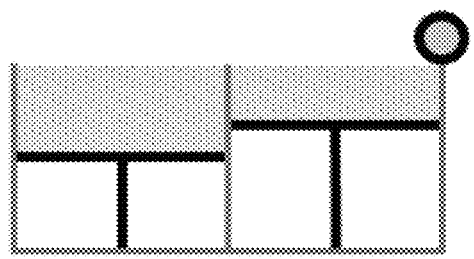
FIG. 3B is a schematic view illustrating an example of a step of forming a powder layer having a smooth surface.

FIG. 3A and FIG. 3B illustrate a step of supplying the resin powder for producing a three-dimensional object from the powder storing tank 12 for supplying to the powder storing tank 11 for forming while forming a resin powder layer having a smooth surface. The stages 13 of the powder storing tank 11 for forming and the powder storing tank 12 for supplying are controlled in a manner that the gap between the stages is adjusted so that a desired layer thickness may be obtained, and the layer forming unit 14 is moved from the powder storing tank 12 for supplying to the powder storing tank 11 for forming, to form a resin powder layer in the powder storing tank 11 for forming.

Figure 3C:
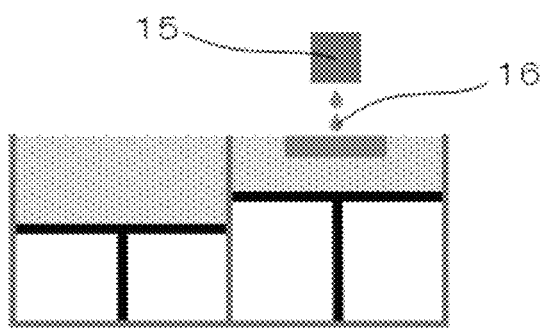
FIG. 3C is a schematic view illustrating an example of a step of dropping a liquid material for producing a three-dimensional object.

FIG. 3C illustrates a step of dropping the liquid material 16 for producing a three-dimensional object to a resin powder layer in the powder storing tank 11 for forming, using the three-dimensional object producing liquid material supplying unit 15. Here, the position to which the liquid material 16 for producing a three-dimensional object is dropped in the resin powder layer is determined based on two-dimensional image data (slice data) representing a number of planes obtained by slicing a three-dimensional object.

Figure 3D:
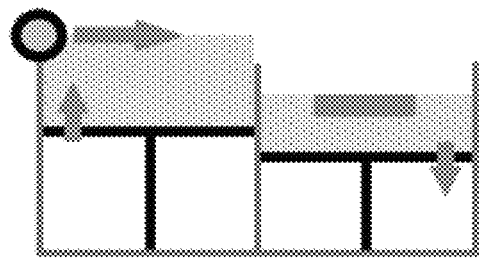
FIG. 3D is a schematic view illustrating an example of a step in which a resin powder layer is newly formed in a powder storing tank for forming.
Figure 3E:
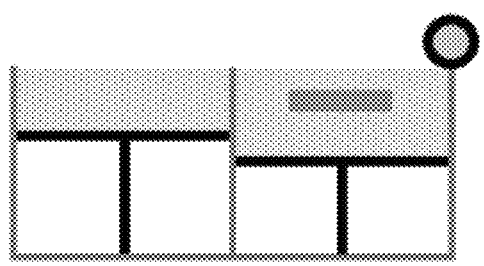
FIG. 3E is a schematic view illustrating an example of a step in which a resin powder layer is newly formed in a powder storing tank for forming.

In FIG. 3D and FIG. 3E, the stage 13 of the powder storing tank 12 for supplying is moved upward and the stage 13 of the powder storing tank 11 for forming is moved downward to control the gap between the stages 13 in a manner to obtain a desired layer thickness, and the layer forming unit 14 is again moved from the powder storing tank 12 for supplying to the powder storing tank 11 for forming, to newly form a resin powder layer in the powder storing tank 11 for forming.

Figure 3F:
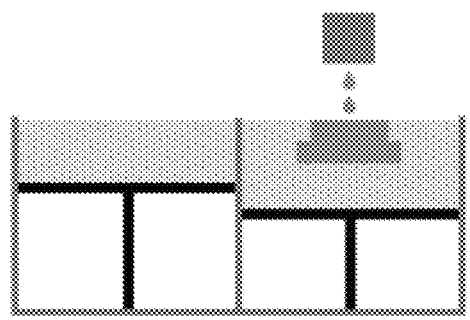
FIG. 3F is a schematic view illustrating an example of a step of again dropping a liquid material for producing a three-dimensional object.

FIG. 3F illustrates a step of again dropping the liquid material 16 for producing a three-dimensional object to the resin powder layer in the powder storing tank 11 for forming, using the three-dimensional object producing liquid material supplying unit 15. These series of steps are repeated, the resultant is dried as needed, and the resin powder for producing a three-dimensional object to which the liquid material for producing a three-dimensional object is not applied (excessive powder) is removed. In this way, a three-dimensional object can be obtained.

In order to mutually bond particles of the resin powder for producing a three-dimensional object, it is preferable to use an adhesive. The adhesive may be added in a dissolved state in the liquid to be discharged, or may be mixed as adhesive particles in the resin powder for producing a three-dimensional object. It is preferable to dissolve the adhesive in the liquid to be discharged. For example, when the liquid to be discharged contains water as a main component, a water-soluble adhesive is preferable.

Examples of the water-soluble adhesive include polyvinyl alcohol (PVA), polyvinyl pyrrolidone, polyamide, polyacrylamide, polyethyleneimine, polyethylene oxide, polyacrylic acid resins, cellulose resins, and gelatin. Among these water-soluble adhesives, polyvinyl alcohol is preferred in order to enhance the strength and dimensional accuracy of a three-dimensional object.

The resin powder for producing a three-dimensional object of the present disclosure has a high fluidity, and can consequently improve the surface property of a three-dimensional object to be produced. Such effects are not limited to methods that employ electromagnetic irradiation, but can be achieved in all three-dimensional object producing apparatuses employing the powder bed additive manufacturing methods represented by binder jet methods.

EXAMPLES

The present disclosure will be described below by way of Examples. The present disclosure should not be construed as being limited to these Examples.

Example 1

A polypropylene resin PB370A (obtained from SunAllomer Ltd., with MFR of 1 (g/10 min) and a melting point of 168 degrees C.) (100 parts by mass) serving as a polyolefin-based resin and a polyolefin-polyethylene oxide block copolymer-type antistatic agent PELECTRON PVL (obtained from Sanyo Chemical Industries, Ltd.) (5 parts by mass) serving as an antistatic agent were stirred and mixed using a Henschel mixer (obtained from Mitsui Mining Co., Ltd.) at a stirring speed of 30 m/s for 5 minutes. Subsequently, polyethylene oxide (ALKOX E-75, obtained from Meisei Chemical Works, Ltd.) (400 parts by mass) serving as a water-soluble resin was added to the resultant, which was further subjected to mixing for 5 minutes, to obtain a sample. Note that MFR indicates the result of measurement at 230 degrees C. according to JIS K 7210.

The obtained sample was melted and kneaded using a biaxial extruder kneader (TEM-18SS, obtained from Toshiba Machine Co., Ltd.). As the kneading conditions, the temperature of the head at the leading end was set to 200 degrees C., and the screw rotation speed was set to 500 rpm.

The melted kneaded sample was rolled and cooled, and coarsely ground with a cutter mill, to obtain coarsely ground products. The obtained coarsely ground products were washed with ion-exchanged water to remove only polyethylene oxide, to obtain a block copolymerized polypropylene resin powder 1.

The obtained block copolymerized polypropylene resin powder 1 (100 parts by mass) and resin minute particles of a styrene acrylic copolymerized resin (cross-linked acrylic monodisperse particles, MX-150, obtained from Soken Chemical & Engineering Co., Ltd., with a number average particle diameter of 0.8 micrometers) (1 part by mass) serving as an external additive were stirred and mixed using a Henschel mixer (obtained from Mitsui Mining Co., Ltd.) at a stirring speed of 30 m/s for 5 minutes, to obtain a resin powder 1.

Example 2

A resin powder 2 was obtained in the same manner as in Example 1, except that unlike in Example 1, the polypropylene resin was changed to BC4BSW (obtained from Japan Polypropylene Corporation, with MFR of 5.5 and a melting point of 167 degrees C.).

Example 3

A resin powder 3 was obtained in the same manner as in Example 1, except that unlike in Example 1, the polypropylene resin was changed to PC480 (obtained from SunAllomer Ltd., with MFR of 3.1 (g/10 min) and a melting point of 168 degrees C.).

Example 4

A resin powder 4 was obtained in the same manner as in Example 1, except that unlike in Example 1, the polypropylene resin was changed to BC6C (obtained from Japan Polypropylene Corporation, with MFR of 4.3 (g/10 min) and a melting point of 153 degrees C.).

Example 5

A resin powder 5 was obtained in the same manner as in Example 1, except that unlike in Example 1, the polypropylene resin was changed to E702MG (obtained from Prime Polymer Co., Ltd., with MFR of 1.8 and a melting point of 174 degrees C.).

Example 6

A resin powder 6 was obtained in the same manner as in Example 3, except that unlike in Example 3, the temperature of the head at the leading end was changed to 180 degrees C. and the screw rotation speed was changed to 300 rpm as the kneading conditions.

Example 7

The resin powder 7 was obtained in the same manner as in Example 1, except that unlike in Example 1, the polypropylene resin was changed to PB222A (obtained from SunAllomer Ltd., with MFR of 2.4 and a melting point of 150 degrees C.).

Example 8

A resin powder 8 was obtained in the same manner as in Example 3, except that unlike in Example 3, the addition amount of the water-soluble resin was changed to 800 parts by mass, and the temperature of the head at the leading end was changed to 220 degrees C. and the screw rotation speed was changed to 600 rpm as the kneading conditions.

Example 9

A resin powder 9 was obtained in the same manner as in Example 3, except that unlike in Example 3, the addition amount of the water-soluble resin was changed to 600 parts by mass, and the temperature of the head at the leading end was changed to 210 degrees C. and the screw rotation speed was changed to 550 rpm as the kneading conditions.

Example 10

A resin powder 10 was obtained in the same manner as in Example 3, except that unlike in Example 3, the addition amount of the water-soluble resin was changed to 300 parts by mass, and the temperature of the head at the leading end was changed to 190 degrees C. and the screw rotation speed was changed to 400 rpm as the kneading conditions.

Example 11

A resin powder 11 was obtained in the same manner as in Example 3, except that unlike in Example 3, the addition amount of the water-soluble resin was changed to 250 parts by mass, and the temperature of the head at the leading end was changed to 180 degrees C. and the screw rotation speed was changed to 300 rpm as the kneading conditions.

Example 12

A resin powder 12 was obtained in the same manner as in Example 3, except that unlike in Example 3, no external additive was added.

Example 13

A resin powder 13 was obtained in the same manner as in Example 3, except that unlike in Example 3, the external additive was changed to styrene-acrylic copolymer resin particles (01-00-501, obtained from Corefront Corporation, with a number average particle diameter of 0.05 micrometers).

Example 14

A resin powder 14 is obtained in the same manner as in Example 3, except that unlike in Example 3, the external additive was changed to styrene-acrylic copolymer resin particles (TECHPOLYMER SSX-102, obtained from Soken Chemical & Engineering Co., Ltd., with a number average particle diameter of 2.3 micrometers).

Example 15

A resin powder 15 was obtained in the same manner as in Example 3, except that unlike in Example 3, the resin was kneaded under the kneading conditions of Example 1 without adding a water-soluble resin and coarsely ground, and the coarsely ground products were minutely ground using a LINREX mill (obtained from Hosokawa Micron Corporation) that was capable of cooling a jacket with liquid nitrogen, and passed through a mesh having a mesh size of 75 micrometers, to obtain polypropylene resin particles. The particles were further spheronized using a spheronizing surface reforming faculty F-430S (obtained from Hosokawa Micron Corporation) at a grinding rotor rotation speed of 5,800 rpm at a classifying rotor rotation speed of 7,000 rpm for a process time of 90 seconds.

Example 16

A resin powder 16 was obtained in the same manner as in Example 1, except that unlike in Example 1, the polypropylene resin was changed to VB170 (obtained from Japan Polypropylene Corporation, with MFR of 0.5 and a melting point of 167 degrees C.).

Example 17

A resin powder 17 was obtained in the same manner as in Example 1, except that unlike in Example 1, the polypropylene resin was changed to FB3B (obtained from Japan Polypropylene Corporation, with MFR of 7 and a melting point of 166 degrees C.).

Example 18

A resin powder 18 was obtained in the same manner as in Example 3, except that unlike in Example 3, the temperature of the head at the leading end was changed to 180 degrees C. and the screw rotation speed was changed to 300 rpm as the kneading conditions.

Comparative Example 1

A resin powder 19 was obtained in the same manner as in Example 1, except that unlike in Example 1, the polypropylene resin was changed to E-333GV (obtained from Prime Polymer Co., Ltd., with MFR of 3.1 and a melting point of 143 degrees C.).

Comparative Example 2

A resin powder 20 was obtained in the same manner as in Example 1, except that unlike in Example 1, the polypropylene resin was changed to E701G (obtained from Prime Polymer Co., Ltd., with MFR of 0.5 and a melting point of 166 degrees C.).

Comparative Example 3

A resin powder 21 was obtained in the same manner as in Example 1, except that unlike in Example 1, the polypropylene resin was changed to BC2E (obtained from Prime Polymer Co., Ltd., with MFR of 9.1 and a melting point of 158 degrees C.).

Comparative Example 4

A resin powder 22 was obtained in the same manner as in Example 1, except that unlike in Example 1, except that unlike in Example 1, the temperature of the head at the leading end was changed to 170 degrees C. and the screw rotation speed was changed to 200 rpm as the kneading conditions.

Comparative Example 5

A resin powder 23 was obtained in the same manner as in Example 1, except that unlike in Example 1, the polypropylene resin was changed to a polyamide resin (PA12, UBESTA3020U, obtained from Ube Industries, Ltd., with MFR of 4.8 and a melting point of 174 degrees C.).

Next, "volume average particle diameter Dv", "particle size distribution (Dv/Dn)", and "average circularity" of the obtained resin powders 1 to 23 were measured in the manners described below. The results are presented in Tables 1-1 to 1-3.

[Volume Average Particle Diameter (Dv) and Particle Size Distribution (Dv/Dn)]

The volume average particle diameter (Dv) (micrometer) of the obtained resin powder was measured using a particle size distribution measuring instrument (obtained from MicrotracBel Corporation. MICROTRAC MT3000II) and a particle refractive index of each resin powder according to a dry (atmospheric) method without a solvent. As the particle refractive index of each resin powder, the refractive index of polypropylene was 1.48, and the refractive index of polyamide was 1.53.

The number average particle diameter (Dn) (micrometer) of the obtained resin powder was measured using a particle size distribution measuring instrument (F-PIA3000 obtained from Sysmex Corporation).

Volume average particle diameter/number average particle diameter (Dv/Dn) was calculated based on the volume average particle diameter (Dv) (micrometer) and the number average particle diameter (Dn) (micrometer) obtained. The results are presented in Tables 1-1 to 1-3.

[Average Circularity]

For measuring the average circularity, the resin powder was weighed out in 100 mg into a 100 mL beaker and mixed well with a surfactant (BN2060, obtained from Tayca Corporation). Ion-exchanged water (70 mL) was added into the resultant. The resultant was stirred for one minute using an ultrasonic washing device, to prepare a measurement sample.

The prepared measurement sample was measured under the conditions described below, to measure the average circularity.

—Conditions for Measuring Average Circularity—
  Wet flow-type particle diameter/shape analyzer (instrument name: FPIA-3000, obtained from Sysmex Corporation)

Three-dimensional objects 1 to 23 were produced under the conditions described below using the obtained resin powders 1 to 23.

—Production of Three-Dimensional Object—

The obtained resin powder was stored for one week in an environment at a temperature of 27 degrees C. and at a relative humidity of 80% RH. A three-dimensional object was produced using the resin powder after stored for one week and a SLS-type three-dimensional object producing apparatus (obtained from Ricoh Company, Ltd., AM S5500P).

As the object production conditions, the average thickness of a powder layer was set to 0.1 mm, the laser output power was set to 10 watts or higher but 150 watts or lower, the laser scanning space was set to 0.1 mm, and the bed temperature was set to a temperature lower than the melting point of the resin by 3 degrees C.

As the test piece to be produced as a three-dimensional object, five tensile test specimens were produced in the longer direction of the tensile test specimens in a manner that the longer side of the specimens extended in the Y axis direction.

The interval between the object forming layers was set to 5 mm.

As the tensile test specimen, a 150 mm-long multipurpose dog bone-like test specimen compliant with International Organization for Standardization (ISO) 3167 Type 1A (the center portion of the specimen having a length of 80 mm, a thickness of 4 mm, and a width of 10 mm) was produced.

"Recoatability", "deflection temperature under load", "surface property (orange peel property)", and "tensile strength" were evaluated in the manners described below. The results are presented in Table 2 below.

<Recoatability>

Using a SLS-type three-dimensional object producing apparatus (obtained from Ricoh Company, Ltd., AM S5500P), recoatability indicating whether or not and how much the obtained powder attached to the recoater or scattered was sensorily evaluated as evaluation of fluidity. The evaluation criteria are as described below.

[Evaluation Criteria]

2: Attachment to the recoater and scattering were not observed.

1: Attachment to the recoater and scattering were slightly observed, but object production was possible 0: Object production was impossible due to attachment to the recoater and scattering.

<Deflection Temperature Under Load>

The obtained three-dimensional object was measured using a HDT tester (obtained from Toyo Seiki Seisaku-sho, Ltd., 3M-2). As the measuring conditions, the sample was set flatwise and evaluated under the conditions compliant with JIS 7191. For evaluation, an average of the five samples was employed as a measured value. The ratings "1" and higher are non-problematic levels for practical use.

[Measuring Conditions]
  Stress: 0.45 MPa
  Amount of standard deflection: 0.34
  Testing start temperature: 30 degrees C.
  Cooling temperature: 30 degrees C.
  Temperature raising rate: 120 degrees C./h
  Warm up time: 5 min
[Evaluation Criteria]
  3: 110 degrees C. or higher
  2: 100 degrees C. or higher but lower than 110 degrees C.
  1: 90 degrees C. or higher but lower than 100 degrees C.
  0: Lower than 90 degrees C.
<Surface Property (Orange Peel Property)>
  The surface of the three-dimensional object was observed visually, observed with an optical microscope, and sensorily tested. The sensory test was performed by touching on the sample with a hand to evaluate the surface property, smoothness in particular based on the feeling of touch. Obtained results were synthesized, and surface property (orange peel property) was evaluated according to the evaluation criteria described blow. The ratings "1" and higher are non-problematic levels for practical use.
[Evaluation Criteria]
  3: The surface was extremely smooth, and almost no bothersome roughness or coarse surface was observed.
  2: The surface smoothness was non-problematic, and roughness of the surface or coarse surface was tolerable.
  1: The surface had no smoothness, and roughness or coarse surface was visibly recognizable.
  0: The surface was scratchy, and many surface defects such as roughness and distortion were observed.

<Tensile Strength>
  The obtained three-dimensional object was tested according to a tensile test compliant with ISO 527 (obtained from Shimadzu Corporation, AGS-5KN). The test speed of the tensile test was 50 mm/minute.
  The tensile strength test was performed at n=5, the maximum tensile stress point measured was determined as "tensile strength", and the maximum tensile strain point measured was determined as "tensile strain". The evaluation criteria are as described below. The ratings "1" or higher are non-problematic levels for practical use.
[Evaluation Criteria]
  3: The tensile strength was 50 N/mm$^2$ or higher.
  2: The tensile strength was 35 N/mm$^2$ or higher but lower than 50 N/mm$^2$.
  1: The tensile strength was 20 N/mm$^2$ or higher but lower than 35 N/mm$^2$.
  0: The tensile strength was lower than 20 N/mm$^2$.
<Total Evaluation>
  For all of the evaluation items, total evaluation was performed according to the evaluation criteria described below. The ratings "1" and higher are non-problematic levels for practical use.
[Evaluation Criteria]
  3: All of the items were rated 2 or higher, and none of the items were rated 1 or lower.
  2: All of the items were rated 1 or higher, and any of the items was rated 3.
  1: All of the items were rated 1 or higher, and none of the items was rated 3.
  0: Any of the items was rated 0.

TABLE 1-1

| | | Prescription | | | Resin properties | | Particle properties | | |
|---|---|---|---|---|---|---|---|---|---|
| | | | External additive | | | | | | |
| | Resin | Kind | Number average particle diameter (micometer) | Resin powder producing method | Viscosity MFR (g/10 min) at 230° C. | Melting point (° C.) | Volume ave. particle dia. Dv (micrometer) | Particle size distribution Dv/Dvm | Average circularity |
| Ex. 1 | Block copoymerized polypropylene | Styrene acrylic coplymer resin | 0.8 | Melting Kneading | 1.0 | 168 | 76 | 1.28 | 0.981 |
| 2 | Block copoymerized polypropylene | Styrene acrylic coplymer resin | 0.8 | Melting Kneading | 5.5 | 167 | 66 | 1.25 | 0.985 |
| 3 | Block copoymerized polypropylene | Styrene acrylic coplymer resin | 0.8 | Melting Kneading | 3.1 | 168 | 73 | 1.24 | 0.977 |
| 4 | Block copoymerized polypropylene | Styrene acrylic coplymer resin | 0.8 | Melting Kneading | 4.3 | 153 | 75 | 1.29 | 0.981 |
| 5 | Block copoymerized polypropylene | Styrene acrylic coplymer resin | 0.8 | Melting Kneading | 1.8 | 174 | 88 | 1.31 | 0.982 |
| 6 | Block copoymerized polypropylene | Styrene acrylic coplymer resin | 0.8 | Melting Kneading | 3.1 | 167 | 86 | 1.32 | 0.971 |
| 7 | Block copoymerized polypropylene | Styrene acrylic coplymer resin | 0.8 | Melting Kneading | 2.4 | 150 | 78 | 1.27 | 0.986 |

TABLE 1-1-continued

| | | Prescription | | | Resin properties | | Particle properties | | |
|---|---|---|---|---|---|---|---|---|---|
| | | External additive | | | | | | | |
| | | | Number average particle diameter (micometer) | Resin powder producing method | Viscosity MFR (g/10 min) at 230° C. | Melting point (° C.) | Volume ave. particle dia. Dv (micrometer) | Particle size distribution Dv/Dvm | Average circularity |
| | Resin | Kind | | | | | | | |
| 8 | Block coploymerized polypropylene | Styrene acrylic coplymer resin | 0.8 | Melting Kneading | 3.1 | 167 | 17 | 1.29 | 0.978 |
| 9 | Block coploymerized polypropylene | Styrene acrylic coplymer resin | 0.8 | Melting Kneading | 3.1 | 167 | 25 | 1.28 | 0.981 |
| 10 | Block coploymerized polypropylene | Styrene acrylic coplymer resin | 0.8 | Melting Kneading | 3.1 | 167 | 95 | 1.24 | 0.983 |

TABLE 1-2

| | | Prescription | | | Resin properties | | Particle properties | | |
|---|---|---|---|---|---|---|---|---|---|
| | | External additive | | | | | | | |
| | | | Number average particle diameter (micometer) | Resin powder producing method | Viscosity MFR (g/10 min) at 230° C. | Melting point (° C.) | Volume ave. particle dia. Dv (micrometer) | Particle size distribution Dv/Dvm | Average circularity |
| | Resin | Kind | | | | | | | |
| Ex. 11 | Block coploymerized polypropylene | Styrene acrylic coplymer resin | 0.8 | Melting Kneading | 3.1 | 167 | 108 | 1.20 | 0.986 |
| 12 | Block coploymerized polypropylene | — | — | Melting Kneading | 3.1 | 167 | 73 | 1.24 | 0.977 |
| 13 | Block coploymerized polypropylene | Styrene acrylic coplymer resin | 0.005 | Melting Kneading | 3.1 | 167 | 73 | 1.24 | 0.977 |
| 14 | Block coploymerized polypropylene | Styrene acrylic coplymer resin | 2.3 | Melting Kneading | 3.1 | 167 | 73 | 1.24 | 0.977 |
| 15 | Block coploymerized polypropylene | Styrene acrylic coplymer resin | 0.8 | Melting Kneading | 3.1 | 167 | 63 | 1.34 | 0.972 |
| 16 | Block coploymerized polypropylene | Styrene acrylic coplymer resin | 0.8 | Melting Kneading | 0.5 | 167 | 76 | 1.28 | 0.981 |
| 17 | Block coploymerized polypropylene | Styrene acrylic coplymer resin | 0.8 | Melting Kneading | 7 | 166 | 63 | 1.24 | 0.986 |
| 18 | Block coploymerized polypropylene | Styrene acrylic coplymer resin | 0.8 | Melting Kneading | 3.1 | 167 | 55 | 1.35 | 0.976 |

TABLE 1-3

| | | Prescription | | | Resin properties | | Particle properties | | |
|---|---|---|---|---|---|---|---|---|---|
| | | | External additive | | | | | | |
| | Resin | Kind | Number average particle diameter (micometer) | Resin powder producing method | Viscosity MFR (g/10 min) at 230° C. | Melting point (° C.) | Volume ave. particle dia. Dv (micrometer) | Particle size distribution Dv/Dvm | Average circularity |
| Comp. Ex. 1 | Block coploymerized polypropylene | Styrene acrylic coplymer resin | 0.8 | Melting Kneading | 3.1 | 143 | 55 | 1.33 | 0.975 |
| 2 | Block coploymerized polypropylene | Styrene acrylic coplymer resin | 0.8 | Melting Kneading | 0.3 | 166 | 93 | 1.29 | 0.984 |
| 3 | Block coploymerized polypropylene | Styrene acrylic coplymer resin | 0.8 | Melting Kneading | 9.1 | 158 | 53 | 1.33 | 0.977 |
| 4 | Block coploymerized polypropylene | Styrene acrylic coplymer resin | 0.8 | Melting Kneading | 3.1 | 167 | 43 | 1.39 | 0.976 |
| 5 | PA12 (polyamide 12) | Styrene acrylic coplymer resin | 0.8 | Melting Kneading | 4.8 | 174 | 75 | 1.29 | 0.981 |

TABLE 2

| | | | Evaluation result | | | | | |
|---|---|---|---|---|---|---|---|---|
| | | Recoatability evaluation | Deflection temperature under load Value (° C.) | Evaluation | Surface property evaluation | Tensile strength Value [N/mm²] | Evaluation | Total evaluation |
| Ex. | 1 | 2 | 117 | 3 | 2 | 36 | 2 | 3 |
| | 2 | 2 | 103 | 2 | 3 | 55 | 3 | 3 |
| | 3 | 2 | 113 | 3 | 3 | 51 | 3 | 3 |
| | 4 | 2 | 97 | 1 | 3 | 52 | 3 | 2 |
| | 5 | 2 | 114 | 3 | 1 | 33 | 1 | 2 |
| | 6 | 1 | 112 | 3 | 3 | 26 | 1 | 2 |
| | 7 | 2 | 92 | 1 | 3 | 23 | 1 | 2 |
| | 8 | 1 | 114 | 3 | 3 | 56 | 3 | 2 |
| | 9 | 2 | 113 | 3 | 3 | 50 | 3 | 3 |
| | 10 | 2 | 111 | 3 | 2 | 36 | 2 | 3 |
| | 11 | 2 | 111 | 3 | 1 | 29 | 1 | 2 |
| | 12 | 2 | 105 | 2 | 3 | 31 | 1 | 2 |
| | 13 | 1 | 115 | 3 | 3 | 55 | 3 | 2 |
| | 14 | 2 | 106 | 2 | 3 | 33 | 1 | 2 |
| | 15 | 1 | 112 | 3 | 3 | 24 | 1 | 2 |
| | 16 | 2 | 120 | 3 | 2 | 35 | 2 | 3 |
| | 17 | 2 | 100 | 2 | 3 | 58 | 3 | 3 |
| | 18 | 2 | 113 | 3 | 3 | 22 | 1 | 2 |
| Comp. Ex. | 1 | 0 | 85 | 0 | 3 | 15 | 0 | 0 |
| | 2 | 0 | 117 | 3 | 0 | 17 | 0 | 0 |
| | 3 | 0 | 83 | 0 | 3 | 55 | 3 | 0 |
| | 4 | 0 | 113 | 3 | 3 | 19 | 0 | 0 |
| | 5 | 0 | 117 | 3 | 3 | 20 | 0 | 0 |

From the results, it was revealed that all Comparative Examples had a poor recoatability and a poor fluidity. The resin powder of Comparative Example 1 had a low melting point of the resin, and was not able to obtain heat resistance hence. The resin powder of Comparative Example 2 had a high viscosity, and the object produced with the resin powder had a poor surface property and a low tensile strength hence. The resin powder of Comparative Example 3 had a low viscosity and had a low heat resistance hence. The resin powder of Comparative Example 4 had a broad particle size distribution, and had a low filling ratio and a low object production strength hence. On the other hand, the resin powders of Examples had a good recoatability and were able to obtain evaluation results that indicate a good fluidity, judging from the total evaluation.

Aspects of the present disclosure are, for example, as follows.

<1> A resin powder including
a polyolefin-based resin,
wherein a melting point of the resin powder is 150 degrees C. or higher,
wherein a melt mass flow rate (MFR) of the resin powder measured according to JIS K 7210 is 0.35 (g/10 min) or greater but 8.50 (g/10 min) or less, and
wherein a particle size distribution (volume average particle diameter Dv/number average particle diameter Dn) of the resin powder is 1.35 or less.

<2> The resin powder according to <1>,
wherein an average circularity of the resin powder is 0.975 or greater.

<3> The resin powder according to <1> or <2>,
wherein the polyolefin-based resin is a block copolymerized polypropylene resin.

<4> The resin powder according to any one of <1> to <3>,
wherein the volume average particle diameter Dv is 20 micrometers or greater but 100 micrometers or less.

<5> The resin powder according to any one of <1> to <4>,
wherein the melting point is 155 degrees C. or higher but 170 degrees C. or lower.

<6> The resin powder according to any one of <1> to <5>,
wherein the resin powder contains resin minute particles over a surface thereof.

<7> The resin powder according to <6>,
wherein a number average particle diameter Dn of the resin minute particles is 0.1 micrometers or greater but 2.0 micrometers or less.

<8> A resin powder for producing a three-dimensional object, the resin powder including
a polyolefin-based resin,
wherein a melting point of the resin powder for producing a three-dimensional object is 150 degrees C. or higher,
wherein a melt mass flow rate (MFR) of the resin powder for producing a three-dimensional object measured according to JIS K 7210 is 0.35 (g/10 min) or greater but 8.50 (g/10 min) or less, and
wherein a particle size distribution (volume average particle diameter Dv/number average particle diameter Dn) of the resin powder for producing a three-dimensional object is 1.35 or less.

<9> The resin powder for producing a three-dimensional object according to <8>,
wherein an average circularity of the resin powder for producing a three-dimensional object is 0.975 or greater.

<10> The resin powder for producing a three-dimensional object according to <8> or <9>,
wherein the polyolefin-based resin is a block copolymerized polypropylene resin.

<11> The resin powder for producing a three-dimensional object according to any one of <8> to <10>,
wherein the volume average particle diameter Dv is 20 micrometers or greater but 100 micrometers or less.

<12> The resin powder for producing a three-dimensional object according to any one of <8> to <11>,
wherein the melting point is 155 degrees C. or higher but 170 degrees C. or lower.

<13> The resin powder for producing a three-dimensional object according to any one of <8> to <12>,
wherein the resin powder for producing a three-dimensional object contains resin minute particles over a surface thereof.

<14> The resin powder for producing a three-dimensional object according to <13>,
wherein a number average particle diameter of the resin minute particles is 0.1 micrometers or greater but 2.0 micrometers or less.

<15> A method for producing the resin powder according to any one of <1> to <7>, the method including
using a melting kneading method.

<16> A three-dimensional object producing method including:
forming a layer containing the resin powder for producing a three-dimensional object according to any one of <8> to <14>; and
mutually bonding particles of the resin powder for producing a three-dimensional object in a selected region of the layer,
wherein the three-dimensional object producing method repeats the forming and the mutually bonding.

<17> A three-dimensional object producing apparatus including:
a layer forming unit configured to form a layer containing the resin powder for producing a three-dimensional object according to any one of <8> to <14>; and
a powder bonding unit configured to mutually bond particles of the resin powder for producing a three-dimensional object in a selected region of the layer.

The resin powder according to any one of <1> to <7>, the resin powder for producing a three-dimensional object according to any one of <8> to <14>, the method for producing the resin powder according to <15>, the three-dimensional object producing method according to <16>, and the three-dimensional object producing apparatus according to <17> can solve the various problems in the related art and achieve the object of the present disclosure.

What is claimed is:

1. A resin powder, comprising:
a polyolefin-based resin,
wherein a melting point of the resin powder is 150 degrees C. or higher,
wherein a melt mass flow rate (MFR) of the resin powder measured according to JIS K 7210 is 0.35 (g/10 min) or greater but 8.50 (g/10 min) or less,
wherein a particle size distribution (volume average particle diameter Dv/number average particle diameter Dn) of the resin powder is 1.35 or less, and
wherein the resin powder contains resin particles over a surface thereof, and wherein a number average particle diameter Dn of the resin particles is 0.1 micrometers or greater but 2.0 micrometers or less.

2. The resin powder according to claim 1,
wherein an average circularity of the resin powder is 0.975 or greater.

3. The resin powder according to claim 1,
wherein the polyolefin-based resin is a block copolymerized polypropylene resin.

4. The resin powder according to claim 1,
wherein the volume average particle diameter Dv is 20 micrometers or greater but 100 micrometers or less.

5. The resin powder according to claim 1,
wherein the melting point is 155 degrees C. or higher but 170 degrees C. or lower.

6. A resin powder for producing a three-dimensional object, the resin powder comprising:
a polyolefin-based resin,
wherein a melting point of the resin powder for producing a three-dimensional object is 150 degrees C. or higher,
wherein a melt mass flow rate (MFR) of the resin powder for producing a three-dimensional object measured according to HS K 7210 is 0.35 (g/10 min) or greater but 8.50 (g/10 min) or less,
wherein a particle size distribution (volume average particle diameter Dv/number average particle diameter Dn) of the resin powder for producing a three-dimensional object is 1.35 or less, and
wherein the resin powder contains resin particles over a surface thereof, and wherein a number average particle diameter Dn of the resin particles is 0.1 micrometers or greater but 2.0 micrometers or less.

7. A three-dimensional object producing method, comprising:
forming a layer containing the resin powder for producing a three-dimensional object according to claim 6; and
mutually bonding particles of the resin powder for producing a three-dimensional object in a selected region of the layer,
wherein the three-dimensional object producing method repeats the forming and the mutually bonding.

* * * * *